US012723329B2

(12) United States Patent
Yang et al.

(10) Patent No.: US 12,723,329 B2
(45) Date of Patent: Sep. 1, 2026

(54) METHOD AND DEVICE FOR PREPARING MODIFIED POLY (M-PHENYLENE ISOPHTHALAMIDE) (PMIA) FIBER BY CONTINUOUS POLYMERIZATION-DRY-WET SPINNING

(71) Applicant: ZHUZHOU TIMES NEW MATERIAL TECHNOLOGY CO., LTD., Zhuzhou (CN)

(72) Inventors: Jun Yang, Zhuzhou (CN); Kaikai Cao, Zhuzhou (CN); Jin Wang, Zhuzhou (CN); Yufeng Liu, Zhuzhou (CN); Zhicheng Song, Zhuzhou (CN); You Yang, Zhuzhou (CN); Feng Yuan, Zhuzhou (CN); Wei Wu, Zhuzhou (CN); Zhijun Zhang, Zhuzhou (CN); Lei Chen, Zhuzhou (CN)

(73) Assignee: ZHUZHOU TIMES NEW MATERIAL TECHNOLOGY CO., LTD., Zhuzhou (CN)

( * ) Notice: Subject to any disclaimer, the term of this patent is extended or adjusted under 35 U.S.C. 154(b) by 15 days.

(21) Appl. No.: 18/263,130

(22) PCT Filed: Oct. 11, 2021

(86) PCT No.: PCT/CN2021/122973
§ 371 (c)(1),
(2) Date: Jul. 26, 2023

(87) PCT Pub. No.: WO2023/039961
PCT Pub. Date: Mar. 23, 2023

(65) Prior Publication Data
US 2024/0084484 A1 Mar. 14, 2024

(30) Foreign Application Priority Data
Sep. 18, 2021 (CN) .......................... 202111109717.6

(51) Int. Cl.
*D01D 1/02* (2006.01)
*C08G 69/32* (2006.01)
(Continued)

(52) U.S. Cl.
CPC ............. *D01F 6/605* (2013.01); *C08G 69/32* (2013.01); *D01D 1/02* (2013.01); *D01D 1/103* (2013.01);
(Continued)

(58) Field of Classification Search
CPC .......... D01F 6/605; C08G 69/32; D01D 1/02; D01D 5/06; D10B 2331/021
See application file for complete search history.

(56) References Cited

U.S. PATENT DOCUMENTS 3,414,645 A * 12/1968 Morgan, Jr. ............. D02G 3/02 264/210.8
3,562,220 A * 2/1971 McMillin ............... C08G 69/32 528/346

(Continued)

FOREIGN PATENT DOCUMENTS

CN 103469343 A 12/2013
CN 106478940 A 3/2017

(Continued)

OTHER PUBLICATIONS

CN106478940 machine translation (Year: 2019).*
JPH03161507 machine translation (Year: 1991).*

*Primary Examiner* — Jacob T Minskey
*Assistant Examiner* — Alexander A Wang
(74) *Attorney, Agent, or Firm* — Nitin Kaushik

(57) ABSTRACT

The present disclosure provides a method and a device for preparing a modified poly (m-phenylene isophthalamide) (PMIA) fiber by continuous polymerization-dry-wet spin-
(Continued)

ning. The method includes the following steps: (1) preparing a mixed solution of m-phenylenediamine (MPD) and a copolymerized diamine monomer in N,N-dimethylacetamide (DMAC) serving as a solvent using a cosolvent; (2) mixing isophthaloyl chloride (IPC) with the mixed solution of the MPD and the copolymerized diamine monomer in the DMAC, and conducting pre-polycondensation and polycondensation in sequence to obtain a modified PMIA resin solution; and (3) subjecting the modified PMIA resin solution to additive addition, filtration, defoaming, and dry-wet spinning to obtain the modified PMIA fiber. In the device for preparing a modified PMIA fiber by continuous polymerization-dry-wet spinning, a prepolymerization system includes a micro-mixer and a micro-reactor that are connected in sequence, and a micro-channel of the micro-reactor is designed to be heart-shaped; and a polycondensation system is a combination of multi-stage micro-screws. The present disclosure comprehensively solves the problems during preparation of the PMIA fiber. Moreover, an obtained product has a perfect structure, excellent performances, and desirable stability and controllability, and can be prepared through continuous high-efficiency production.

13 Claims, 3 Drawing Sheets

(51) Int. Cl.
*D01D 1/10* (2006.01)
*D01D 5/06* (2006.01)
*D01D 10/00* (2006.01)
*D01F 1/10* (2006.01)
*D01F 6/60* (2006.01)

(52) U.S. Cl.
CPC ............... *D01D 1/106* (2013.01); *D01D 5/06* (2013.01); *D01D 10/00* (2013.01); *D01F 1/10* (2013.01); *D10B 2331/021* (2013.01); *D10B 2401/063* (2013.01)

(56) References Cited

U.S. PATENT DOCUMENTS

2006/0282958 A1* 12/2006 Yang ......................... D01F 4/00 8/116.1
2009/0054620 A1* 2/2009 Takiue .................... D01F 6/605 264/178 F
2015/0113714 A1* 4/2015 Lee .......................... D01D 5/06 428/221

FOREIGN PATENT DOCUMENTS

| | | | | |
|---|---|---|---|---|
| CN | 106498538 | A | | 3/2017 |
| CN | 107200843 | A | | 9/2017 |
| JP | H03161507 | | * | 7/1991 |
| WO | WO2009044766 | A1 | | 4/2009 |

* cited by examiner

METHOD AND DEVICE FOR PREPARING MODIFIED POLY (M-PHENYLENE ISOPHTHALAMIDE) (PMIA) FIBER BY CONTINUOUS POLYMERIZATION-DRY-WET SPINNING

CROSS-REFERENCE TO RELATED APPLICATIONS

The application claims priority to Chinese patent application No. 2021111097176, filed on Sep. 18, 2021, the entire contents of which are incorporated herein by reference.

TECHNICAL FIELD

The present disclosure belongs to the field of polymer materials, and relates to the manufacturing technology of resins and fibers. In particular, the present disclosure relates to a method and a device for preparing an aramid fiber product by continuous polymerization-dry-wet spinning.

BACKGROUND

Due to a unique chemical structure, aromatic polyamides (also known as aramids) are endowed with excellent properties such as desirable modulus, excellent strength, high-temperature resistance, and insulation. Since the appearance in the 1960s and 1970s, aramids have attracted wide attention from international researchers to conduct studies and developments. At present, the aramids have become one of the key materials in the high-tech field, and are widely used in cutting-edge fields such as electronics, national defense, aerospace, military, and emergency rescue, as well as high-end civilian applications such as rail transit, construction, high-temperature transmission, filtration, and sporting goods. Heterocycles such as imidazole, oxazole, and thiazole have excellent thermal stability and desirable polarity. The introduction of these heterocycles into a polymer backbone not only improves the heat resistance and mechanical properties, but also improves the solubility and processability of the polymers due to the presence of heteroatoms. Russia was the first country to develop heterocyclic aramid fibers such as Armos and SVM. The modulus and strength of this type of heterocyclic aramid fibers are much higher than those of poly (p-phenylene isophthalamide) (PPIA) or poly (m-phenylene isophthalamide) (PMIA), and even comparable to those of a high-performance carbon fiber T800H. Therefore, the development and research of heterocyclic aramid fibers have been widely concerned by the field of high-performance materials and then become a major research hotspot. The research of PPIA heterocycle modification has entered a mature stage and is monopolized by foreign patents and markets. However, the research on PMIA modification is still in an embryonic development stage, and has a large room for breakthrough.

Currently, China is facing the following difficulties in PMIA spinning:

1) The PMIA resin prepared by traditional reactor-type batch polymerization has low molecular weight, wide molecular weight distribution, undesirable solid content of spinning solution, and poor batch stability.

In China, a commonly used method for preparing the PMIA resin is low-temperature solution polymerization using a tank reactor. On one hand, a PMIA polymerization system has a high heat release rate, while the tank reactor only has an external jacket for heat exchange. Therefore, the heat of the reaction system cannot be removed quickly, and the low temperature and the temperature uniformity of the reaction system cannot be guaranteed. In this way, the reaction shows extremely poor synchronization, there are many side reactions, and the molecular weight and distribution of the polymer are difficult to control. On the other hand, the PMIA polymerization system has a high viscosity, such that the stirring form of a kettle-type polymerizer cannot make the materials mix evenly. Especially in a later stage of the reaction, the viscosity of the polymerization system increases, thus further increasing the difficulty of material mixing. As a result, local monomer concentrations are excessively high or low, which causes local implosion or poor local polymerization degree. Accordingly, the reaction is insufficient, resulting in an obtained PMIA resin with low molecular weight, wide molecular weight distribution, and poor spinnability of the resin solution.

2) The properties of fibers obtained by wet spinning cannot meet the application requirements of high-end fields.

The mature commercial preparation processes of PMIA fibers mainly include wet spinning and dry spinning. The wet spinning has relatively low difficulty, large output of a single spinneret, and low production cost. However, obtained fibers generally have mediocre properties. The fibers prepared by the dry spinning have excellent comprehensive properties. However, the dry spinning has high difficulty, strict requirements to process control and equipment, and high production cost. Dry-wet spinning combines the characteristics of the wet spinning and the dry spinning. However, compared with the wet spinning, the dry-wet spinning has higher requirements on the spinning solution and process control. Therefore, it is necessary to improve the spinning solution, spinning equipment, and process.

3) Continuous high-efficiency production has not been realized; the PMIA resin solution has low neutralization and filtration efficiency, and includes inorganic salts that may cause spinneret plate clogging, fuzziness, fracture of wire, and unsatisfactory fiber performances.

SUMMARY

A technical problem to be solved by the present disclosure is to improve the overall equipment and process, to prepare a modified PMIA fiber with a perfect structure and excellent performances. In order to overcome the deficiencies and defects mentioned in the background, the present disclosure provides a method and a device for preparing a modified PMIA fiber by continuous polymerization-dry-wet spinning.

The technical solutions of the present disclosure are as follows:

The present disclosure provides a method for preparing a modified PMIA fiber by continuous polymerization-dry-wet spinning, including the following steps:

(1) preparing a mixed solution of m-phenylenediamine (MPD) and a copolymerized diamine monomer;

(2) mixing isophthaloyl chloride (IPC) with the mixed solution of the MPD and the copolymerized diamine monomer, and conducting pre-polycondensation to obtain a prepolymer; and conducting polycondensation on the prepolymer to obtain a modified PMIA resin solution; and (3) subjecting the modified PMIA resin solution to additive addition, filtration, defoaming, and dry-wet spinning to obtain the modified PMIA fiber.

A key to producing the PMIA resin with a high molecular weight by low-temperature solution polycondensation lies in the following three points: (1) a purity of raw materials, a measurement accuracy, and a water content of the system are strictly controlled to ensure equi-molarity of the reaction monomers acyl chloride and diamine; (2) efficient heat exchange in the system is required to conduct precise control of reaction temperature, thus avoiding side reactions; (3) the system has efficient mass transfer to ensure uniform mixing of the raw materials.

In the present disclosure, improvements are made in the following three directions for the above three points: 1) the copolymerized diamine monomer is introduced or the additive is added to improve the spinnability of PMIA spinning solution; 2) a spinning solution of the high-molecular-weight and high-solid PMIA resin is prepared using a continuous polymerization device combining a micro-channel-containing reactor and multi-stage micro-screws, so as to help the reaction system for heat dissipation and mass transfer; 3) based on the performance of the aforementioned spinning solution, a high-performance PMIA fiber is prepared by dry-wet spinning with corresponding parameters.

Preferably, in step (1), a preparation method of the mixed solution of the MPD and the copolymerized diamine monomer includes: dissolving a cosolvent in a solvent, conducting water removal with a drying system, and dissolving the copolymerized diamine monomer and the MPD in an obtained cosolvent-containing solvent.

Conventional PMIA resin polymerization does not specifically need a cosolvent, because chloride salts obtained by neutralizing a by-product hydrochloric acid can act as the cosolvent. Adding a cosolvent here is beneficial to the dissolution of the copolymerized diamine monomer and polymer, and is also beneficial to obtaining high-molecular-weight polymers.

Preferably, in step (1), a solvent of the mixed solution of the MPD and the copolymerized diamine monomer is N,N-dimethylacetamide (DMAC).

Preferably, in step (1), the cosolvent is an inorganic chloride of an alkali metal or an alkaline earth metal, and the cosolvent is added at 0.1% to 10%, more preferably 0.2% to 5% a mass of the solvent of the mixed solution of the MPD and the copolymerized diamine monomer.

Preferably, the inorganic chloride of the alkali metal or the alkaline earth metal is LiCl.

Compared with chloride salts such as calcium chloride and sodium chloride, the LiCl has better solubilizing effect in aramid fiber dissolution, lower molecular weight, less amount of cosolvent, and weaker desalination pressure.

Preferably, the copolymerized diamine monomer is at least one selected from the group consisting of 6,4'-diamino-2'-trifluoromethyl-2-phenylbenzimidazole, 2-(4-aminophenyl)-5-aminophenylbenzimidazole, 5-amino-2-(4-aminophenyl)benzoxazole, 5-amino-2-(4-aminophenyl) benzothiazole, 2,6-diaminobenzothiazole, 2,6-diaminopyridine, 2-(4-aminophenyl)-5-aminopyridine, 2,5-bis(4-aminophenyl)pyridine, o-chloro-p-phenylenediamine, and p-phenylenediamine; and the copolymerized diamine monomer has a molar content 0.1% to 10%, more preferably 1% to 5% that of the IPC.

The copolymerized diamine monomer can be dissolved in DMAC, has rigid molecular structure and thermal stability, and contains polar groups. Therefore, on the basis of not affecting the stability of the system, the viscosity of the spinning solution is increased to improve the spinnability; meanwhile, the fiber mechanics and heat resistance are not reduced or improved.

Preferably, in step (2), the mixing is conducted in a micro-mixer, the IPC is added into the micro-mixer in a molten state at 45° C. to 60° C., more preferably 50° C. to 60° C., the DMAC mixed solution of the IPC and the MPD and copolymerized diamine monomer is added into the micro-mixer in a solution state at 20 to 10° C., and the micro-mixer is controlled at −20° C. to 60° C., more preferably −20° C. to 10° C.; the pre-polycondensation is conducted in a micro-reactor, and the micro-reactor is controlled at 10° C. to 60° C., more preferably 10° C. to 30° C.

The micro-channel reactor is generally used in reactions with low viscosity. In the present disclosure, the viscosity of the solution is relatively high, such that a heart-shaped micro-reactor is used. The heart-shaped micro-channel increases a heat exchange area in the reactor, while the heart-shaped design helps the solution in the reactor to mix. In this way, micro-channel blockage is avoided, and heat exchange efficiency, mass transfer effect, and product quality are improved.

In step (2), the polycondensation is conducted in a multi-stage micro-screw device, and the multi-stage micro-screw device is controlled at 20° C. to 70° C., more preferably 30° C. to 60° C.

Preferably, the micro-reactor is in a shape selected from the group consisting of heart, circle, triangle, line, and spire.

The micro-reactor has a large heat exchange area and a desirable mixing efficiency, quickly realizes heat exchange, and avoids the excessively high reaction temperature at an initial stage of pre-polycondensation. Therefore, the precise control of the temperature during the pre-polycondensation can be realized, thereby preventing the high-temperature oxidative yellowing of the resin and the formation of by-products that are caused by local overheating. The micro-reactor can be heart-shaped, circular, and oval, and a heart-shaped micro-reactor is preferred.

Due to the structural design of the heart-shaped micro-channel, the heart-shaped micro-channel reactor (FIG. 2) greatly improves the heat exchange area and the mixing efficiency, such that raw materials can be fully mixed in the tube. Meanwhile, the micro-channel reactor avoids local overheating, thereby improving the molecular weight and molecular weight distribution of the resin, and increasing the spinnability of the spinning solution and the performances of an obtained fiber.

Due to the special structural design of the heart-shaped micro-reactor, the materials can be fully mixed in a heart-shaped area, further polymerized, and then transported to the back end through pipelines. Moreover, a part of the materials can be mixed and reacted with newly-added materials through side-end pipelines, thereby increasing the molecular weight and molecular weight distribution of the resin. In this way, the spinnability of the spinning solution is improved, and the properties of the obtained fiber are enhanced, especially the mechanical properties and heat resistance.

Preferably, the modified PMIA resin has an inherent viscosity of greater than or equal to 1.8 dl/g.

Preferably, in step (3), the modified PMIA resin solution is added with an organic additive capable of forming a hydrogen bond with an amide group before the filtration.

Preferably, the organic additive is at least one selected from the group consisting of low-molecular-weight alcohol and acid, and a high-heat-resistant silicone; the low-molecular-weight alcohol and acid are at least one selected from the group consisting of trifluoroacetamide, trifluoroethanol, trifluoroacetic acid, hexafluoroisopropanol, ethylene glycol, glycerol, sorbic acid, and salicylic acid, and are added at 0.01 wt % to 3 wt %, more preferably 0.05 wt % to 1 wt % of a dosage of the modified PMIA resin solution; and the silicone is at least one selected from the group consisting of a polyether-modified polysiloxane and a fluorine-containing or alkoxyl-containing or hydroxyl-containing polysiloxane, and is added at 0.1 wt % to 10 wt %, more preferably 0.1 wt % to 2 wt % of a dosage of the modified PMIA resin solution.

The organic additive reduces a surface tension and increases an apparent viscosity of the resin solution, thereby enhancing spinnability and improving surface activity, which is helpful for the subsequent dry-wet spinning.

Preferably, in step (3), the dry-wet spinning includes the following steps: passing a spinning solution through a spinneret plate and then through an air layer, and entering a first coagulation bath to obtain a nascent fiber; and pre-drafting the nascent fiber, entering a second coagulation bath, and conducting water washing, drying, dry heat stretching, heat setting, and winding/cutting to obtain the modified PMIA fiber.

Preferably, the spinneret plate has a pore size of 0.06 mm to 0.25 mm. On the premise of ensuring the spinnability of the spinning solution, slowing down a swelling effect of the orifice of the spinning solution is beneficial to obtaining fibers with better properties. The spinning solution passes through the air layer with a height of 2 mm to 80 mm, more preferably 5 mm to 60 mm. The spinning solution forms filaments in the air layer, and a part of the solvent evaporates from the filaments. At the same time, through the drafting of a first roller, the filaments are pre-oriented to a certain extent in the air layer and obtain sufficient strength, which is beneficial to the smooth progress of subsequent processes. The pre-drafting is conducted at a drafting speed 2 to 5 times, more preferably 2.5 to 4 times a spinning speed of the spinning solution. Drafting directly affects the micro-structure of the fiber, which in turn affects the performances of the fiber. The drafting rate is determined according to the properties of the spinning solution obtained from the modified PMIA resin solution of the present disclosure.

Preferably, the first coagulation bath and the second coagulation bath each are a DMAC aqueous solution; the first coagulation bath has a DMAC concentration of 20 wt % to 45 wt %, more preferably 25 wt % to 40 wt % and a temperature of 20° C. to 50° C., more preferably 25° C. to 40° C. In this coagulation bath, no other additives or inorganic salts are additionally added, which reduces the cost of solvent recovery and improves the economic benefits of fiber production.

The second coagulation bath has a DMAC concentration of 15 wt % to 40 wt % and a temperature of 30° C. to 60° C. The second coagulation bath with a lower temperature makes the solvent diffusion and precipitation in the filaments smoother, and makes the fiber structure more perfect. A plasticizing stretching factor is 1.1 to 4; the solvent in the fiber is further diffused outward by plasticizing and stretching, and a higher degree of orientation is obtained.

The dry heat stretching is conducted in the form of a pipeline or a slit, at 280° C. to 350° C., more preferably 290° C. to 330° C. and a stretching factor of 1.1 to 3, more preferably 1.5 to 2.5. Excessive high stretching factors can easily lead to fiber breakage, resulting in fracture of wire and fuzziness; while too low stretching factors can cause the inability to obtain high enough crystallinity and orientation degree of the fiber, such that there is a low overall performance.

The heat setting is conducted in the form of a pipeline or a slit, at 280° C. to 350° C., more preferably 290° C. to 330° C.

Preferably, a modified PMIA fiber prepared by the continuous polymerization-dry-wet spinning has a breaking strength of greater than or equal to 6.0 cN/dtex, an elongation of 25% to 50%, and an initial modulus of greater than or equal to 90 cN/dtex.

Under a same technical idea, the present disclosure further provides a device for preparing a modified PMIA fiber by continuous polymerization-dry-wet spinning, including a raw material storage device, a prepolymerization system, a polycondensation system, a post-treatment system, a spinning system, a coagulation and water washing system, a drying system, a heat treatment system, a winding/cutting system, and a heat exchange system; where the prepolymerization system, the polycondensation system, and the post-treatment system are connected in sequence; the heat exchange system is separately connected with the prepolymerization system and the polycondensation system to control temperatures of the prepolymerization system and the polycondensation system; the prepolymerization system includes a micro-mixer and a micro-reactor that are connected in sequence; the polycondensation system includes a multi-stage micro-screw device; and the micro-reactor is connected with the multi-stage micro-screw device.

Preferably, the raw material storage device includes an IPC storage tank, an MPD and copolymerized diamine monomer storage tank, a solvent storage tank, and a cosolvent-containing solvent storage tank; the IPC storage tank and the MPD and copolymerized diamine monomer storage tank are connected to the micro-mixer through a constant-flow-rate pump and a convey pipeline, respectively.

Preferably, a solvent dehydration device is connected between the MPD and copolymerized diamine monomer storage tank and the cosolvent-containing solvent storage tank; and the IPC storage tank, the MPD and copolymerized diamine monomer storage tank, the constant-flow-rate pump, and the convey pipeline each are covered with a thermal insulation jacket.

Preferably, the heat exchange system includes a refrigeration cycle device and a heating cycle device; the refrigeration cycle device includes a refrigeration medium storage tank filled with a cold medium, a heat exchange medium delivery pump, a first rotameter, and a first medium convey pipeline; the heat exchange medium delivery pump and the first rotameter are connected between the refrigeration medium storage tank and the micro-mixer, and the medium convey pipeline connects the refrigeration medium storage tank, the micro-mixer, and the micro-reactor to form a circulation loop; the heating cycle device includes a heating medium storage tank filled with a hot medium, the heat exchange medium delivery pump, a second rotameter, and a second medium convey pipeline; the heat exchange medium delivery pump and the second rotameter are connected between the heating medium storage tank and the multi-stage micro-screw device, and the medium convey pipeline connects the heating medium storage tank and the multi-stage micro-screw device to form a circulation loop.

The multi-stage micro-screw device includes but not limited to a first-stage micro-screw device, a second-stage micro-screw device, a third-stage micro-screw device, and a fourth-stage micro-screw device that are connected in sequence; the first-stage micro-screw device to the fourth-stage micro-screw device each are covered with the thermal insulation jacket, and a heat medium in the heating cycle device is introduced into the thermal insulation jacket; the first-stage micro-screw device to the fourth-stage micro-screw device have a gradually increasing screw diameter, a gradually decreasing screw L/D ratio, a gradually decreasing screw speed, and a gradually increasing jacket temperature in sequence; the first-stage micro-screw device to the fourth-stage micro-screw device have independently a screw diameter of 15 mm to 40 mm, a screw L/D ratio of 30 to 80, a screw speed of 100 rpm to 420 rpm, and a jacket temperature of 30° C. to 60° C.; and screws of the first-stage micro-screw device to the fourth-stage micro-screw device are one or more selected from the group consisting of a single-thread screw, a double-thread screw, a triple-thread screw, and a quadruple-thread screw.

Compared with the prior art, the present disclosure has the following beneficial effects:

1) In the present disclosure, during the continuous polymerization to obtain the modified PMIA resin solution, the copolymerized diamine monomer is introduced or the additive is added to improve the spinnability of PMIA spinning solution; a spinning solution of the high-molecular-weight and high-solid PMIA resin is prepared, so as to help the reaction system for heat dissipation and mass transfer; and based on the performance of the aforementioned spinning solution, a high-performance PMIA fiber is prepared by dry-wet spinning with corresponding parameters.
2) Dry-wet spinning has higher requirements for spinning solution than wet spinning. The spinnability of the spinning solution is improved by introducing a third comonomer containing polar groups and adding an organic additive that can form hydrogen bonds with amide groups into a main chain of the polymer. At the same time, other functional fillers or additives can be added according to the requirements of use. The third comonomer containing polar groups can increase the intermolecular force, while improving the surface wettability of PMIA; the organic additive can form hydrogen bonds with the PMIA molecular chain, reduce the surface tension of the system, increase the apparent viscosity, and improve the spinnability of the resin stock solution. Low-molecular-weight alcohols and carboxylic acid additives contain groups such as —F, —OH, and —COOH, which can form hydrogen bonds with amide groups in the main chain of the PMIA molecule to improve the spinnability of the resin stock solution. Moreover, such additives are highly easy to be removed during coagulation and water washing, without affecting the structure and performances of the final fiber product. The highly heat-resistant silicone additives can form hydrogen bonds with amide groups in the main chain of the PMIA molecule through groups such as —O—, —F, —OR, and —OH to improve the spinnability of the resin stock solution. Moreover, these additives can act as oil agents during the fiber spinning, reducing fuzziness and improving product appearance. In addition, polysiloxane has excellent properties such as high heat resistance, and does not affect the performance of fiber products.
3) The resin stock solution obtained by continuous polymerization does not need to be neutralized, and can be directly spun, thus avoiding neutralization, filtration, and desalination processes, so as to improve production efficiency. Meanwhile, this avoids the fuzziness or broken filaments caused by inorganic salts clogging the spinneret plate and the defects such as holes caused by salt precipitation. Therefore, the internal structure, appearance, and various performances of fiber products are improved.
4) Micro-reactors are used for prepolymerization, thereby solving the problem of heat transfer and avoiding the occurrence of side reactions. The micro-reactor has a superior heat transfer effect and can effectively transfer the heat released by the reaction system at the initial stage of polymerization; the micro-reactor ensures that the temperature of the system can be precisely controlled, prevents the formation of by-products caused by local overheating of the system, and ensures that the product resin has low molecular polydispersity and stable and controllable intrinsic viscosity.
5) Multi-stage micro-screws are used for polycondensation, which solves the problem of mass transfer and obtains the resin stock solution with high molecular weight and desirable solid content (high viscosity). A low-viscosity polymer coming out of the micro-reactor enters the multi-stage micro-screw device. The multi-stage micro-screw device is mainly used to solve the mass transfer problem after the viscosity of the polymerization system rises sharply, and the viscosity of the polymer increases rapidly in the multi-stage micro-screw device.
6) The multi-stage micro-screw device is matched with the micro-reactor for prepolymerization to ensure the continuous stability of the reaction device. Moreover, by adjusting the speed of the micro-screw device and the residence time of the materials at different stages, the mass transfer requirements of the polycondensation stage of the aramid polymerization can be completed, so as to meet different requirements simultaneously. Furthermore, compared with traditional reactors, the continuous micro-reaction device has no amplification effect and is suitable for large-scale continuous industrial production.
7) The dry-wet spinning combines the advantages of dry spinning and wet spinning, taking into account the high performance of aramid fibers and the high spinning efficiency. By controlling the process, the dry-wet spinning of PMIA is successfully realized, and a PMIA fiber with excellent performances is obtained.

BRIEF DESCRIPTION OF DRAWINGS

To describe the technical solutions in examples of the present disclosure or in the prior art more clearly, the accompanying drawings required for describing the examples or the prior art will be briefly described below. Apparently, the accompanying drawings in the following description show some examples of the present disclosure, and a person of ordinary skill in the art may still derive other drawings from these accompanying drawings without creative efforts.

Figure 1:
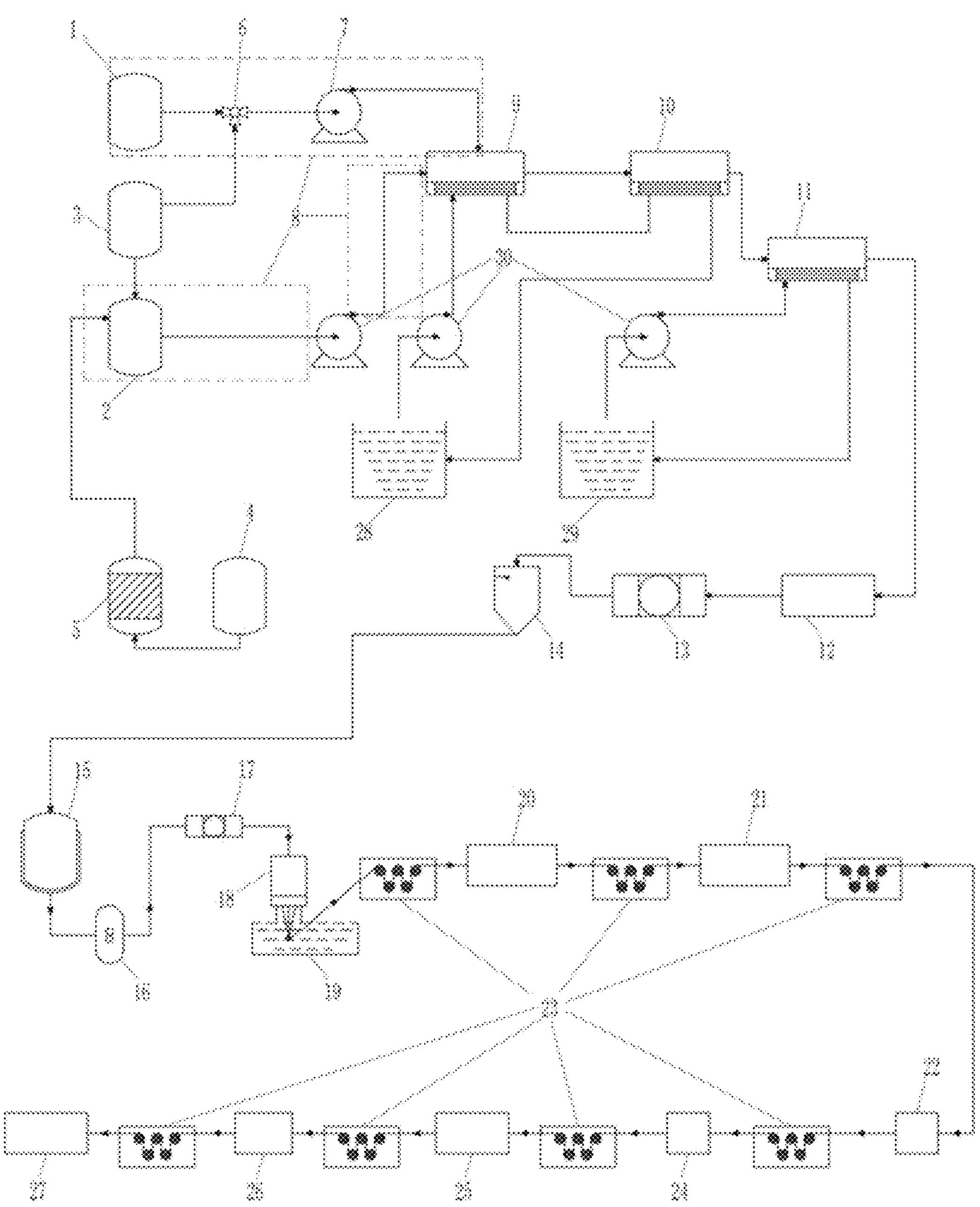
FIG. 1 shows a device and a flow chart of the continuous polymerization-dry-wet spinning in Example 1.

Reference Numerals: 1. IPC storage tank; 2. MPD and copolymerized diamine monomer storage tank; 3. Solvent storage tank; 4. Cosolvent-containing solvent storage tank; 5. Dehydration device; 6. Three-way valve; 7. Constant-flow-rate pump; 8. Thermal insulation jacket; 9. Micro-mixer; 10. Micro-reactor; 11. Multi-stage micro-screw device; 12. Additive addition and mixing device; 13. Filter; 14. Defoaming kettle; 15. Spinning solution storage tank; 16. Metering pump; 17. Spinning filter; 18. Spinning assembly; 19. Coagulation bath; 20. First coagulation bath; 21. Second coagulation bath; 22. Water washing system; 23. Traction machine; 24. Drying system; 25. Dry heat stretching device; 26. Heat setting device; 27. Winding/cutting system; 28. Refrigeration medium storage tank; 29. Heating medium storage tank; and 30. Heat exchange medium delivery pump.

DETAILED DESCRIPTION OF THE EMBODIMENTS

In order to facilitate the understanding of the present disclosure, the present disclosure is described in detail below in conjunction with the accompanying drawings of the specification and the preferred examples, but the protection scope of the present disclosure is not limited to the following specific examples.

Unless otherwise defined, all technical terms used hereinafter have the same meaning as commonly understood by those skilled in the art. The technical terms used herein are merely for the purpose of describing specific examples, and are not intended to limit the protection scope of the present disclosure.

Unless otherwise specified, various raw materials, reagents, instruments, equipment, and the like used in the present disclosure can be purchased from the market or can be prepared by existing methods.

Example 1

In the present disclosure, the examples were all conducted in a device for preparing a modified PMIA fiber by continuous polymerization-dry-wet spinning. Referring to FIG. 1, the device includes the following systems:

(1) A raw material storage device includes an IPC storage tank 1, an MPD and copolymerized diamine monomer storage tank 2, a solvent storage tank 3, a cosolvent-containing solvent storage tank 4, and a dehydration device 5. In the raw material storage device, the cosolvent-containing solvent storage tank 4 is connected to the dehydration device 5, the dehydration device 5 and the solvent storage tank 3 are connected to the MPD and copolymerized diamine monomer storage tank 2, and the IPC storage tank 1 is connected to a constant-flow-rate pump 7 and the solvent storage tank 3 through a three-way valve 6. The constant-flow-rate pump 7 is connected to a micro-mixer 9, and the MPD and copolymerized diamine monomer storage tank 2 is also connected to the micro-mixer 9 through the constant-flow-rate pump. The IPC storage tank 1, the MPD and copolymerized diamine monomer storage tank 2, the constant-flow-rate pump 7, and a convey pipeline are all covered with a thermal insulation jacket 8 for controlling a temperature of raw materials before entering the micro-mixer.

Figure 2:
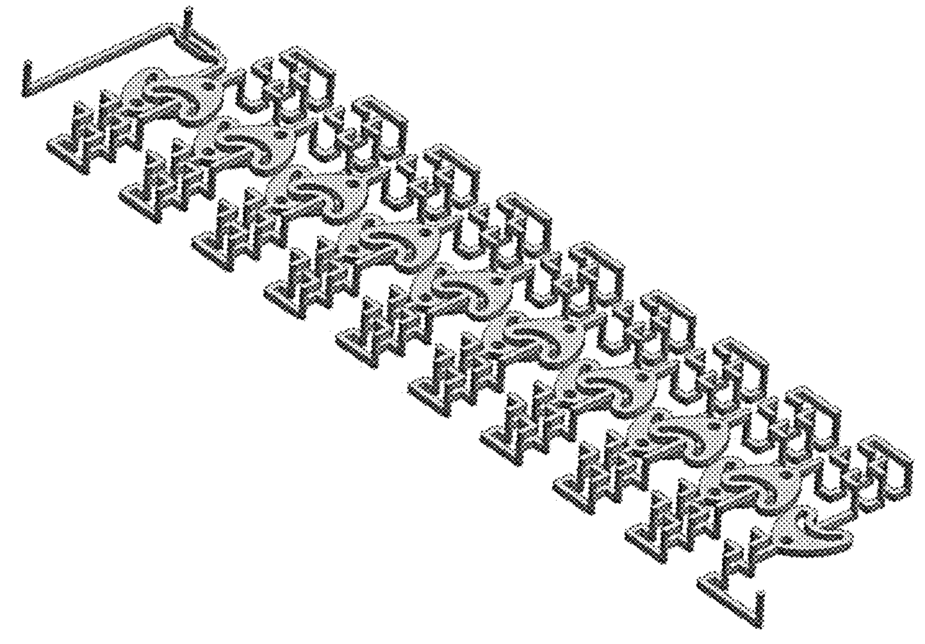
FIG. 2 shows a structural diagram of a heart-shaped micro-channel reactor in Example 1.

(2) A prepolymerization system includes a micro-mixer 9, a micro-reactor 10, a metering pump, a delivery pipe valve, and instruments (a pressure gauge and a temperature gauge). The micro-mixer 9 is connected to the micro-reactor 10. The micro-reactor is a heart-shaped micro-channel reactor shown in FIG. 2. The micro-reactor is designed to be heart-shaped, and a plurality of the heart-shaped micro-reactors is connected by micro-channels, and the micro-channels are connected to the tip and the depression of the heart shape, respectively.

(3) A polycondensation system includes a multi-stage micro-screw device 11; and the multi-stage micro-screw device 11 is connected to the micro-reactor 10.

(4) A post-treatment system includes an additive addition and mixing device 12, a filter 13, a defoaming kettle 14, and a spinning solution storage tank 15.

(5) A spinning system includes a metering pump 16, a spinning filter 17, and a spinning assembly 18; and the spinneret assembly includes a spinneret and a spinneret plate.

(6) A coagulation and water washing system includes a coagulation bath 19, a first coagulation bath 20, a second coagulation bath 21, and a water washing system 22; and the water washing system 22 includes a washing machine, a washing liquid storage tank, and a drafting roller.

(7) A drying system 24 includes a dryer and a drafting roller.

(8) A heat treatment system includes a dry heat stretching device 25, a heat setting device 26, a nitrogen system, and a drafting roll.

(9) A winding/cutting system 27 includes a winding machine/a cutting machine.

The components in the coagulation and water washing system, the drying system 24, the heat treatment system device, and the winding/cutting system 27 are separately connected by a traction machine 23.

(10) A heat exchange system includes a refrigeration medium storage tank 28, a heating medium storage tank 29, a heat exchange medium delivery pump 30, a heat exchange medium storage tank, and a rotameter. The heat exchange medium delivery pump 30 and the rotameter are connected between the refrigeration medium storage tank 28 and the micro-mixer 9, and a medium convey pipeline connects the refrigeration medium storage tank 28, the micro-mixer 9, and the micro-reactor 10 to form a circulation loop. The heat exchange medium delivery pump 30 and the rotameter are connected between the heating medium storage tank 29 and the multi-stage micro-screw device 11, and the medium convey pipeline connects the heating medium storage tank 29 and the multi-stage micro-screw device 11 to form a circulation loop. The multi-stage micro-screw device 11 includes a first-stage micro-screw device, a second-stage micro-screw device, a third-stage micro-screw device, and a fourth-stage micro-screw device that are connected in sequence; the first-stage micro-screw device to the fourth-stage micro-screw device each are covered with the thermal insulation jacket, and a heat medium in the heating cycle device is introduced into the thermal insulation jacket; the first-stage micro-screw device to the fourth-stage micro-screw device have a gradually increasing screw diameter, a gradually decreasing screw L/D ratio, a gradually decreasing screw speed, and a gradually increasing jacket temperature in sequence; the first-stage micro-screw device to the fourth-stage micro-screw device have independently a screw diameter of 15 mm to 40 mm, a screw L/D ratio of 30 to 80, a screw speed of 100 rpm to 420 rpm, and a jacket temperature of 30° C. to 60° C.; and screws of the first-stage micro-screw device to the fourth-stage micro-screw device can be a single-thread screw, a double-thread screw, a triple-thread screw, or a quadruple-thread screw.

A preparation process of Example 1 was specifically as follows:

As shown in the flow chart in FIG. 1, a DMAC mixed solution of MPD containing LiCl (2%) with a solid content of 10 wt % and 6,4'-diamino-2'-trifluoromethyl-2-phenylbenzimidazole were prepared according to a molar ratio of 98:2, and kept at −20° C. IPC was melt and kept at 55° C. The mixed solution and an obtained IPC cylinder were measured in equimolar amounts by a constant-flow-rate pump, mixed through the micro-mixer 9 and delivered to the heart-shaped micro-reactor 10, where the micro-mixer 9 and the micro-reactor 10 are controlled at −20° C. to 10° C. and 10° C. to 30° C., respectively. An obtained prepolymer flowing out of the micro-reactor 10 flowed into the first-stage micro-screw device to the fourth-stage micro-screw device for polycondensation. The first-stage micro-screw device had a screw diameter of 15 mm, a screw L/D ratio of 80, a screw speed of 420 rpm, and a jacket temperature of 30° C. The second-stage micro-screw device had a screw diameter of 20 mm, a screw L/D ratio of 60, a screw speed of 300 rpm, and a jacket temperature of 40° C. The third-stage micro-screw device had a screw diameter of 30 mm, a screw L/D ratio of 40, a screw speed of 220 rpm, and a jacket temperature of 50° C. The fourth-stage micro-screw device had a screw diameter of 40 mm, a screw L/D ratio of 30, a screw speed of 100 rpm, and a jacket temperature of 60° C. The screws in the first-stage micro-screw device to the fourth-stage micro-screw device were all quadruple-thread screws. An obtained polymer flowing out from the multi-stage micro-screw device 11 entered the post-treatment system, and was added with 1 wt % trifluoroethanol, filtered, and defoamed to obtain a spinning solution. The spinning solution was subjected to spinning, water washing, drying, dry heat stretching, heat setting, and winding or cutting to obtain a modified PMIA fiber. The spinneret plate had a pore size of 0.12 mm, the air layer had a height of 40 mm, and a drafting speed of pre-orientation was 3.5 times a spinning speed of the spinning solution. The first coagulation bath had a DMAC concentration of 25 wt % and a temperature of 40° C. The second coagulation bath had a DMAC concentration of 20 wt % and a temperature of 55° C. A plasticizing stretching factor was 3.0. The dry heat stretching was conducted at 310° C. and a stretching factor of 2.0. The heat setting was conducted at 320° C.

Example 2

In this example, a reaction device was the same as that in Example 1, this example differed from Example 1 in that: the spinneret plate had a pore size adjusted to 0.1 mm, an air layer was adjusted to 20 mm, and a drafting speed of the first drafting roller was adjusted to 3.0 times a spinning speed of the spinning solution. The first coagulation bath had a DMAC concentration adjusted to 35 wt % and a temperature adjusted to 40° C. The second coagulation bath had a DMAC concentration adjusted to 25 wt % and a temperature adjusted to 45° C. The plasticizing stretching factor was adjusted to 2.5. Other processes and parameters were identical with those of Example 1.

Example 3

In this example, a reaction device was the same as that in Example 1, this example differed from Example 1 in that: an air layer was adjusted to 10 mm, and a drafting speed of the first drafting roller was adjusted to 2.0 times a spinning speed of the spinning solution. The first coagulation bath had a temperature adjusted to 35° C. The second coagulation bath had a temperature adjusted to 45° C. The plasticizing stretching factor was adjusted to 2.8. Other processes and parameters were identical with those of Example 1.

Example 4

In this example, a reaction device was the same as that in Example 1, this example differed from Example 1 in that: an air layer was adjusted to 60 mm, and a drafting speed of the first drafting roller was adjusted to 4.0 times a spinning speed of the spinning solution. The first coagulation bath had a DMAC concentration adjusted to 30 wt % and a temperature adjusted to 25° C. The second coagulation bath had a DMAC concentration adjusted to 25 wt % and a temperature adjusted to 35° C. The plasticizing stretching factor was adjusted to 3.2. Other processes and parameters were identical with those of Example 1.

Example 5

In this example, a reaction device was the same as that in Example 1, this example differed from Example 1 in that: the dry heat stretching was conducted at a temperature adjusted to 300° C. and a factor adjusted to 1.8. The heat setting was conducted at a temperature adjusted to 310° C. Other processes and parameters were identical with those of Example 1.

Example 6

In this example, a reaction device was the same as that in Example 1, this example differed from Example 1 in that: the dry heat stretching was conducted at a temperature adjusted to 320° C. and a factor adjusted to 2.4. The heat setting was conducted at a temperature adjusted to 330° C. Other processes and parameters were identical with those of Example 1.

Example 7

In this example, a reaction device was the same as that in Example 1, this example differed from Example 1 in that: the copolymerized diamine monomer was replaced with 2-(4-aminophenyl)-5-aminophenylbenzimidazole, a molar ratio of the MPD to the copolymerized diamine monomer was 95:5, and an amount of the LiCl was adjusted to 4%, the additive was replaced with 0.05% glycerol. Other processes and parameters were identical with those of Example 1, to obtain a modified PMIA fiber.

Figure 3:
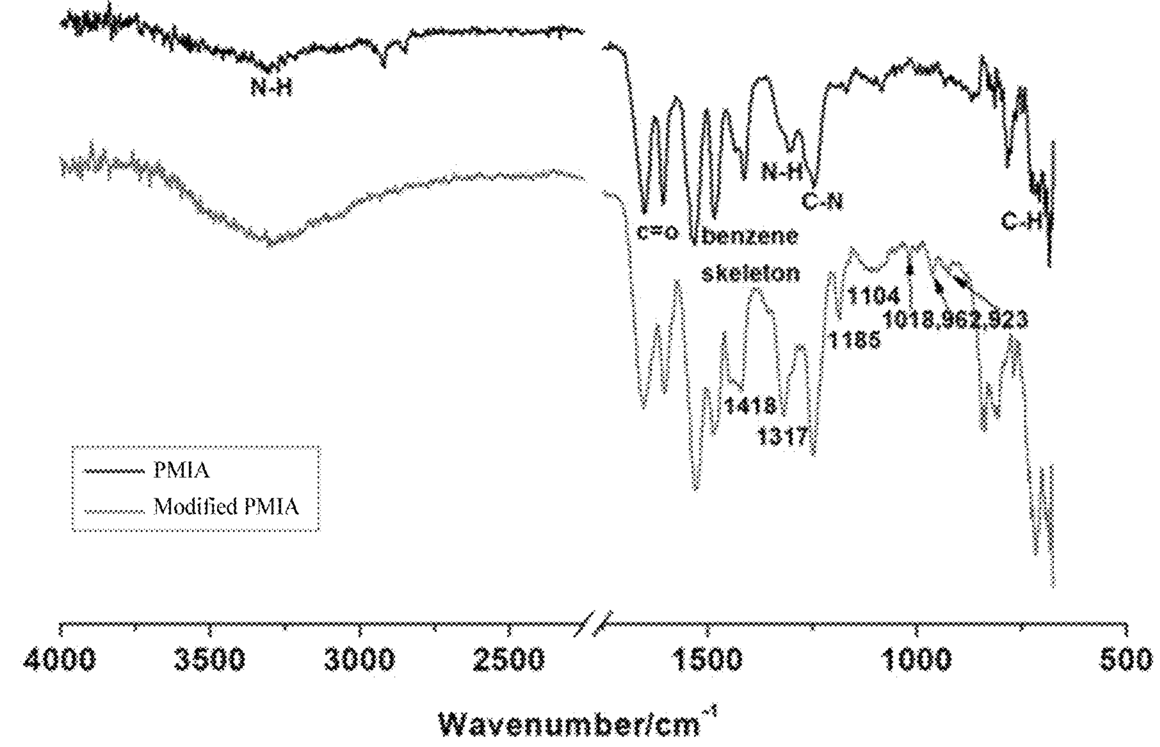
FIG. 3 shows an infrared spectrum of a modified PMIA resin containing a copolymerized diamine monomer in Example 7.

FIG. 3 showed an infrared spectrum of the modified PMIA resin containing the copolymerized diamine monomer in Example 7.

Example 8

In this example, a reaction device was the same as that in Example 1, this example differed from Example 1 in that: the copolymerized diamine monomer was replaced with 5-amino-2-(4-aminophenyl) benzoxazole, a molar ratio of the MPD to the copolymerized diamine monomer was 97:3, and an amount of the LiCl was adjusted to 3%, the additive was replaced with a 1.5% polyether-modified polysiloxane. Other processes and parameters were identical with those of Example 1, to obtain a modified PMIA fiber.

Example 9

In this example, a reaction device was the same as that in Example 1, this example differed from Example 1 in that: the copolymerized diamine monomer was replaced with 5-amino-2-(4-aminophenyl) benzothiazole, a molar ratio of the MPD to the copolymerized diamine monomer was 96:4, and an amount of the LiCl was adjusted to 4%. Other processes and parameters were identical with those of Example 1, to obtain a modified PMIA fiber.

Example 10

In this example, a reaction device was the same as that in Example 1, this example differed from Example 1 in that: the copolymerized diamine monomer was replaced with 2,6-diaminobenzothiazole, the additive was replaced with 0.3% sorbic acid. Other processes and parameters were identical with those of Example 1, to obtain a modified PMIA fiber.

Example 11

In this example, a reaction device was the same as that in Example 1, this example differed from Example 1 in that: the copolymerized diamine monomer was replaced with 2,6-diaminopyridine, the additive was replaced with 0.1% salicylic acid. Other processes and parameters were identical with those of Example 1, to obtain a modified PMIA fiber.

Example 12

In this example, a reaction device was the same as that in Example 1, this example differed from Example 1 in that: the copolymerized diamine monomer was replaced with 2-(4-aminophenyl)-5-aminopyridine, the additive was replaced with 0.2% trifluoroacetamide. Other processes and parameters were identical with those of Example 1, to obtain a modified PMIA fiber.

Example 13

In this example, a reaction device was the same as that in Example 1, this example differed from Example 1 in that: the copolymerized diamine monomer was replaced with 2,5-bis(4-aminophenyl) pyridine, the additive was replaced with 2% hydroxyl-containing polysiloxane. Other processes and parameters were identical with those of Example 1, to obtain a modified PMIA fiber.

Example 14

In this example, a reaction device was the same as that in Example 1, this example differed from Example 1 in that: the copolymerized diamine monomer was replaced with o-chloro-p-phenylenediamine, a molar ratio of the MPD to the copolymerized diamine monomer was 95:5, and an amount of the LiCl was adjusted to 1%, the additive was replaced with 0.2% trifluoroacetic acid. Other processes and parameters were identical with those of Example 1, to obtain a modified PMIA fiber.

Example 15

In this example, a reaction device was the same as that in Example 1, this example differed from Example 1 in that: the copolymerized diamine monomer was replaced with p-phenylenediamine, the additive was replaced with 0.8% fluorine-containing polysiloxane. Other processes and parameters were identical with containing 1, to obtain a modified PMIA fiber.

Comparative Example 1: Pure PMIA, Batch Polymerization-Wet Spinning

The PMIA was prepared by traditional tank-type batch polymerization, where resin had an inherent viscosity of 1.84, a molecular weight distribution of 1.49, and a viscosity of 28,000 cp at 50° C. A PMIA fiber was obtained by wet spinning.

Comparative Example 2: Pure PMIA, Batch Polymerization-Dry-Wet Spinning

A polymerization method was the same as that of Comparative Example 1, and the viscosity at 50° C. was 80,000 cp. The dry-wet spinning had a phenomenon of "pasted plate".

Comparative Example 3: Pure PMIA, Continuous Polymerization-Wet Spinning

The PMIA was prepared by continuous polymerization, where resin had an inherent viscosity of 1.82, a molecular weight distribution of 1.39, and a viscosity of 36,000 cp at 50° C. A PMIA fiber was obtained by wet spinning.

Comparative Example 4: Pure PMIA, Continuous Polymerization-Dry-Wet Spinning

A polymerization method was the same as that of Comparative Example 3, and the viscosity at 50° C. was 76,000 cp. The dry-wet spinning had general spinnability of the spinning solution, and there are fuzziness and broken filaments.

Comparative Example 5: Pure PMIA, Continuous Polymerization-Adding Additives-Dry-Wet Spinning 0.5 wt % ethylene glycol was added to the PMIA resin solution of Comparative Example 4, and the viscosity at 50° C. was 82,000 cp. A PMIA fiber was obtained by dry-wet spinning, and the spinnability of the spinning solution was improved to a certain extent compared with Comparative Example 4, and the occurrence frequency of fuzziness and broken filaments was reduced.

Comparative Example 6: Modified PMIA, Continuous Polymerization-Dry-Wet Spinning A modified PMIA resin with the copolymerized diamine monomer o-chloro-p-phenylenediamine at a content of 2% (mole fraction) was prepared by continuous polymerization. The resin had an inherent viscosity of 2.08, a molecular weight distribution of 1.41, and a viscosity of 70,000 cp at 50° C. A PMIA fiber was obtained by dry-wet spinning, and the spinnability of the spinning solution was improved to a certain extent compared with Comparative Example 4, and the occurrence frequency of fuzziness and broken filaments was reduced.

TABLE 1

Performance comparison of Examples (E) and Comparative Examples (CE)

| SN | Resin inherent viscosity, dL/ | Spinning solution viscosity, cP | Preparation method | Spinnability and fiber morphology | Fiber breaking strength, cN/dtex | Elongation, % | Initial modulus, cN/dtex |
|---|---|---|---|---|---|---|---|
| E1 | 2.12 | 78000 | Continuous polymerization-dry-wet spinning | Smooth surface with less fuzziness | 7.3 | 32.8 | 118.7 |
| E2 | 2.12 | 78000 | Continuous polymerization-dry-wet spinning | Smooth surface with no fuzziness | 6.5 | 40.3 | 108.6 |
| E3 | 2.12 | 78000 | Continuous polymerization-dry-wet spinning | Smooth surface with no fuzziness | 6.3 | 43.2 | 104.7 |
| E4 | 2.12 | 78000 | Continuous polymerization-dry-wet spinning | Smooth surface with no fuzziness | 7.8 | 30.2 | 125.5 |
| E5 | 2.12 | 78000 | Continuous polymerization-dry-wet spinning | Smooth surface with no fuzziness | 6.8 | 38.4 | 110.2 |
| E6 | 2.12 | 78000 | Continuous polymerization-dry-wet spinning | Smooth surface with no fuzziness | 7.5 | 31.8 | 122.5 |
| E7 | 2.26 | 86000 | Continuous polymerization-dry-wet spinning | Smooth surface with no fuzziness | 7.6 | 26 | 124.6 |
| E8 | 2.33 | 88000 | Continuous polymerization-dry-wet spinning | Smooth surface with no fuzziness | 7.1 | 27 | 118.3 |
| E9 | 2.48 | 92000 | Continuous polymerization-dry-wet spinning | Smooth surface with no fuzziness | 6.5 | 28 | 115.6 |
| E10 | 2.36 | 88000 | Continuous polymerization-dry-wet spinning | Smooth surface with no fuzziness | 6.9 | 32 | 119.8 |
| E11 | 2.65 | 96000 | Continuous polymerization-dry-wet spinning | Smooth surface with no fuzziness | 7.6 | 28 | 126.3 |
| E12 | 2.34 | 88000 | Continuous polymerization-dry-wet spinning | Smooth surface with no fuzziness | 7.8 | 29 | 124.8 |
| E13 | 2.54 | 94000 | Continuous polymerization-dry-wet spinning | Smooth surface with no fuzziness | 8.1 | 26 | 121.6 |
| E14 | 2.26 | 82000 | Continuous polymerization-dry-wet spinning | Smooth surface with no fuzziness | 7.5 | 28 | 115.1 |
| E15 | 2.74 | 130000 | Continuous polymerization-dry-wet spinning | Smooth surface with no fuzziness | 8.4 | 34 | 130.5 |
| CE1 | 1.84 | 28000 | Batch polymerization-wet spinning | Desirable, grooved surface | 4.1 | 17 | 88.6 |
| CE2 | 1.84 | 80000 | Batch polymerization-dry-wet spinning | Pasted plate | 4.3 | 19 | 96.5 |
| CE3 | 1.82 | 36000 | Continuous polymerization-wet spinning | Desirable, grooved surface | 4.2 | 23 | 94.7 |
| CE4 | 1.82 | 76000 | Continuous polymerization-dry-wet spinning | Fuzziness and broken filaments | 4.5 | 24 | 100.8 |
| CE5 | 1.82 | 82000 | Continuous polymerization-dry-wet spinning | Fuzziness and broken filaments | 4.6 | 25 | 102.3 |
| CE6 | 2.08 | 70000 | Continuous polymerization-dry-wet spinning | Fuzziness and broken filaments | 4.8 | 18 | 105.8 |

What is claimed is:

1. A method for preparing a modified poly (m-phenylene isophthalamide) (PMIA) fiber by continuous polymerization-dry-wet spinning, comprising the following steps:

(1) preparing a mixed solution of m-phenylenediamine (MPD) and a copolymerized diamine monomer;

(2) mixing isophthaloyl chloride (IPC) with the mixed solution of the MPD and the copolymerized diamine monomer, and conducting pre-polycondensation to obtain a prepolymer; and conducting polycondensation on the prepolymer to obtain a modified PMIA resin solution; and (3) subjecting the modified PMIA resin solution to additive addition, filtration, defoaming, and dry-wet spinning to obtain the modified PMIA fiber, wherein in step (3), the modified PMIA resin solution is added with an organic additive capable of forming a hydrogen bond with an amide group before the filtration;

wherein the organic additive is at least one selected from the group consisting of low-molecular-weight alcohol and acid, and a high-heat-resistant silicone; the low-molecular-weight alcohol and acid are at least one selected from the group consisting of trifluoroacetamide, trifluoroethanol, trifluoroacetic acid, hexafluoroisopropanol, ethylene glycol, glycerol, sorbic acid, and salicylic acid, and are added at 0.01 wt % to 3 wt % of a dosage of the modified PMIA resin solution; and the silicone is at least one selected from the group consisting of a polyether-modified polysiloxane and a fluorine-containing or alkoxyl-containing or hydroxyl-containing polysiloxane, and is added at 0.1 wt % to 10 wt % of a dosage of the modified PMIA resin solution.

2. The method for preparing a modified PMIA fiber by continuous polymerization-dry-wet spinning according to claim 1, wherein in step (1), a preparation method of the mixed solution of the MPD and the copolymerized diamine monomer comprises: dissolving a cosolvent in a solvent, conducting water removal with a drying system, and dissolving the copolymerized diamine monomer and the MPD in an obtained cosolvent-containing solvent.

3. The method for preparing a modified PMIA fiber by continuous polymerization-dry-wet spinning according to claim 1, wherein in step (1), a solvent of the mixed solution of the MPD and the copolymerized diamine monomer is N,N-dimethylacetamide (DMAC).

4. The method for preparing a modified PMIA fiber by continuous polymerization-dry-wet spinning according to claim 2, wherein in step (1), the cosolvent is an inorganic chloride of an alkali metal or an alkaline earth metal, and the cosolvent is added at 0.1% to 10% of a mass of the solvent of the mixed solution of the MPD and the copolymerized diamine monomer.

5. The method for preparing a modified PMIA fiber by continuous polymerization-dry-wet spinning according to claim 4, wherein the inorganic chloride of the alkali metal or the alkaline earth metal is LiCl.

6. The method for preparing a modified PMIA fiber by continuous polymerization-dry-wet spinning according to claim 1, wherein the copolymerized diamine monomer is at least one selected from the group consisting of 6,4'-diamino-2'-trifluoromethyl-2-phenylbenzimidazole, 2-(4-aminophenyl)-5-aminophenylbenzimidazole, 5-amino-2-(4-aminophenyl) benzoxazole, 5-amino-2-(4-aminophenyl) benzothiazole, 2,6-diaminobenzothiazole, 2,6-diaminopyridine, 2-(4-aminophenyl)-5-aminopyridine, 2,5-bis(4-aminophenyl) pyridine, o-chloro-p-phenylenediamine, and p-phenylenediamine; and the copolymerized diamine monomer has a molar content 0.1% to 10% that of the IPC.

7. The method for preparing a modified PMIA fiber by continuous polymerization-dry-wet spinning according to claim 1, wherein in step (2), the mixing is conducted in a micro-mixer, the IPC is added into the micro-mixer in a molten state at 45° C. to 60° C., the mixed solution of the MPD and the copolymerized diamine monomer is added into the micro-mixer in a solution state at −20° C. to 10° C., and the micro-mixer is controlled at −20° C. to 60° C.; and the micro-reactor is controlled at 10° C. to 60° C.; and the polycondensation is conducted in a multi-stage micro-screw device, and the multi-stage micro-screw device is controlled at 20° C. to 70° C.

8. The method for preparing a modified PMIA fiber by continuous polymerization-dry-wet spinning according to claim 7, wherein the micro-reactor is in a shape selected from the group consisting of heart, circle, triangle, line, and spire.

9. The method for preparing a modified PMIA fiber by continuous polymerization-dry-wet spinning according to claim 1, wherein the modified PMIA resin has an inherent viscosity of greater than or equal to 1.8 dl/g.

10. The method for preparing a modified PMIA fiber by continuous polymerization-dry-wet spinning according to claim 1, wherein in step (3), the dry-wet spinning comprises the following steps: passing a spinning solution through a spinneret plate and then through an air layer, and entering a first coagulation bath to obtain a nascent fiber; and pre-drafting the nascent fiber, entering a second coagulation bath, and conducting water washing, drying, dry heat stretching, heat setting, and winding/cutting to obtain the modified PMIA fiber.

11. The method for preparing a modified PMIA fiber by continuous polymerization-dry-wet spinning according to claim 10, wherein the spinneret plate has a pore size of 0.06 mm to 0.25 mm; the spinning solution passes through the air layer with a height of 2 mm to 80 mm; and the pre-drafting is conducted at a drafting speed 2 to 5 times a spinning speed of the spinning solution.

12. The method for preparing a modified PMIA fiber by continuous polymerization-dry-wet spinning according to claim 10, wherein the first coagulation bath and the second coagulation bath each are a DMAC aqueous solution; the first coagulation bath has a DMAC concentration of 20 wt % to 45 wt % and a temperature of 20° C. to 50° C., and the second coagulation bath has a DMAC concentration of 15 wt % to 40 wt % and a temperature of 30° C. to 60° C.; a plasticizing stretching factor is 1.1 to 4; the dry heat stretching is conducted at 280° C. to 350° C. and a stretching factor of 1.1 to 3; and the heat setting is conducted at 280° C. to 350° C.

13. The method for preparing a modified PMIA fiber by continuous polymerization-dry-wet spinning according to claim 1, wherein a PMIA fiber prepared by the continuous polymerization-dry-wet spinning has a breaking strength of greater than or equal to 6.0 cN/dtex, an elongation of 25% to 50%, and an initial modulus of greater than or equal to 90 cN/dtex.

* * * * *